(12) United States Patent
Bowman et al.

(10) Patent No.: US 6,267,188 B1
(45) Date of Patent: Jul. 31, 2001

(54) DRIVE ASSEMBLY FOR INDEPENDENTLY DRIVING VEHICLE WHEELS

(75) Inventors: Larry W. Bowman, Troy; Raji S. El-Kassouf, Sterling Heights; Richard M. Clisch, Canton; Patrick D. Laper, Rochester; Michael G. Semke, Novi; Gary P. Ford, Rochester, all of MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/532,989

(22) Filed: Mar. 22, 2000

(51) Int. Cl.$^7$ .................................................. B62D 61/10
(52) U.S. Cl. ...................................... 180/24.03; 180/65.6
(58) Field of Search ................................ 180/24.03, 65.6

(56) References Cited

U.S. PATENT DOCUMENTS

| | | | |
|---|---|---|---|
| 1,207,658 | * 12/1916 | Swain | 180/65.6 |
| 1,914,266 | * 6/1933 | Leupold | 180/24.03 |
| 2,030,548 | * 2/1936 | Smeets | 180/24.03 |
| 2,082,001 | * 6/1937 | Hanson | 180/65.6 |
| 2,126,960 | 8/1938 | Higbee | 180/22 |
| 2,213,473 | 9/1940 | Peterman | 180/22 |
| 2,214,457 | 9/1940 | Fuhrman | 301/135 |
| 2,242,454 | 5/1941 | Cochran | 280/95 |
| 2,298,334 | 10/1942 | Ash | 180/22 |
| 2,389,339 | 11/1945 | Ash | 180/22 |
| 2,905,505 | 9/1959 | Delker et al. | 301/36 |
| 3,027,959 | * 4/1962 | Mailliard | 180/65.6 |
| 3,534,825 | * 10/1970 | Reffle | 180/65.6 |
| 6,145,611 | * 11/2000 | Haddad, Sr. | 180/65.6 |

* cited by examiner

*Primary Examiner*—Kenneth R. Rice
(74) *Attorney, Agent, or Firm*—Carlson, Gaskey & Olds

(57) ABSTRACT

A drive assembly for independently driving wheels of a vehicle is disclosed. The drive assembly includes a wheel set positioned at a left or right side of the vehicle. The wheel set includes inner and outer wheels and tires associated with the inner and outer wheels. A drive mechanism, such as an electric motor, rotatably drives the inner and outer wheels. The drive assembly further includes a differential disposed between the inner and outer wheels and responds to the drive mechanism to permit one of the inner and outer wheels to rotate independent of the other of the inner and outer wheels. That is, upon a turn of the vehicle, the differential permits the inner and outer wheels to realize different rotational speeds as the inner and outer wheels are being rotatably driven by the drive mechanism. As such, scrubbing or dragging of the tires associated with the wheels is eliminated. Additionally, the drive assembly of the subject invention can incorporate a second wheel set and tires, a second drive mechanism, and a second differential positioned at the opposite side of the vehicle to eliminate scrubbing of the tires associated with the second wheel set.

14 Claims, 1 Drawing Sheet

DRIVE ASSEMBLY FOR INDEPENDENTLY DRIVING VEHICLE WHEELS

BACKGROUND OF THE INVENTION

The subject invention relates to a drive assembly for independently driving dual-wheel assemblies of a vehicle.

In general, dual-wheel assemblies are utilized to increase the load capacity of a vehicle. Typically, the dual-wheel assemblies are disposed at each side of the vehicle and include inner and outer wheels with tires secured together to rotate in unison during a vehicle turn. Commonly, dual-wheel assemblies are necessary in container-loading environments, such as ship yards where cargo containers are being loaded and unloaded, and the resulting tire loads would be too large for a single tire to withstand. In such environments, vehicles are often required to continuously undergo tight turns due to the relatively confined quarters and the general congestion of such environments. The tires of the dual-wheel assemblies experience uneven and excessive wear caused by scrubbing or dragging of the tires upon the repeated turning of the vehicle. Each wheel of the dual-wheel assemblies must travel different linear distances to complete a turn. Since the inner and outer wheels are secured together, the tires scrub or drag thereby causing excessive wear.

Prior art vehicles have incorporated a primary differential between a pair of dual-wheel assemblies. A secondary conventional differential has also been arranged between the wheels of each dual-wheel assembly. Such conventional assemblies are limited in that the assemblies cannot independently drive the wheels of the dual-wheel assemblies. These assemblies do not permit one dual-wheel assembly at one side of the vehicle to be driven with driving forces which are different than those applied to the dual-wheel assembly at the other side of the vehicle, which limits maneuverability. Therefore, what is needed is a drive assembly that reduces scrub and increases maneuverability of the vehicle.

SUMMARY OF THE INVENTION AND ADVANTAGES

A drive assembly for independently driving wheels of a vehicle is disclosed. More specifically, the drive assembly of the subject invention independently drives the wheels of a vehicle that incorporates at least one wheel set at a lateral side of the vehicle. The first wheel set includes a first inner wheel and a first outer wheel. The drive assembly also includes a first drive mechanism for rotatably driving the wheels.

Additionally, the drive assembly incorporates a first differential that is disposed between the first inner and outer wheels and responsive to the first drive mechanism to permit one of the first inner and outer wheels to rotate independent of the other of the first inner and outer wheels. The first inner and outer wheels realize different rotational speeds as the wheels are being rotatably driven by the first drive mechanism, and tires incorporated with the first inner and outer wheels do not experience uneven or excessive wear due to scrubbing or dragging of the tires upon a turn of the vehicle because the first inner wheel is permitted to rotate independent of the second inner wheel throughout the turn.

The drive assembly of the subject invention also incorporates a second wheel set having a second inner wheel and a second outer wheel that is positioned at a second lateral side of the vehicle. Additionally, a second drive mechanism and a second differential are positioned at a second lateral side of the vehicle in the preferred embodiment of the subject invention. The second wheel set, the second drive mechanism, and the second differential operate the same as the first wheel set, the first drive mechanism, and the first differential described above. Consequently, wear of tires due to scrubbing or dragging is also eliminated at the second lateral side of the vehicle.

Accordingly, the subject invention provides a drive assembly that independently reduces scrub and increases maneuverability of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
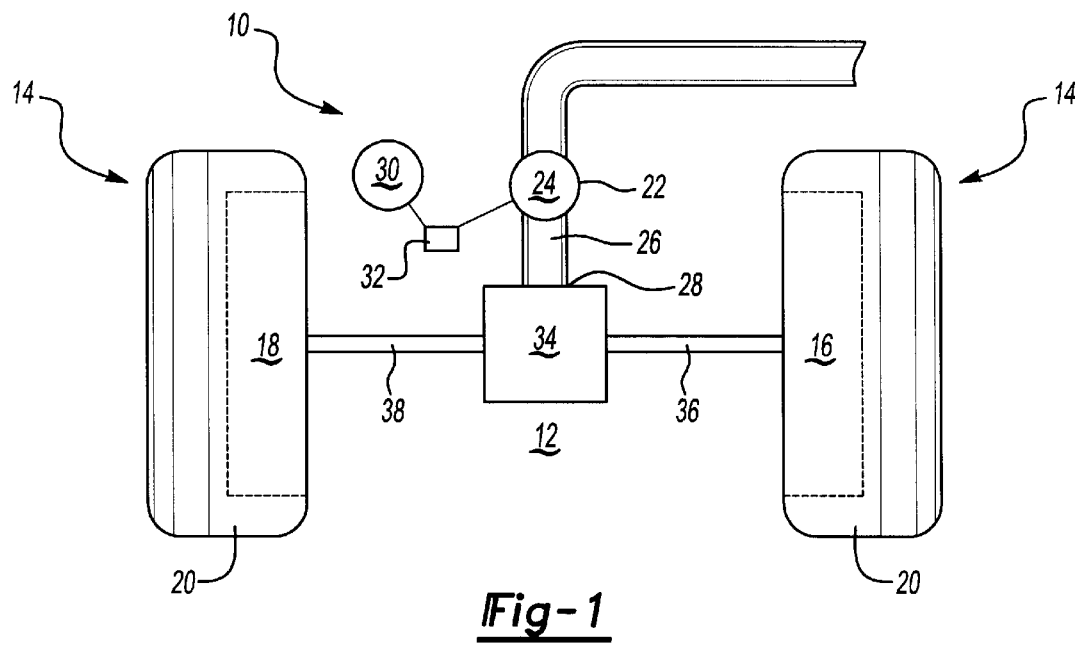
FIG. 1 is schematic front view of a drive assembly for a vehicle illustrating a first wheel set positioned at a first lateral side of the vehicle, a first drive mechanism, and a first differential disposed between a first inner and outer wheel of the first wheel set.

Referring to FIG. 1, a drive assembly 10 is positioned at a first lateral side 12 of a vehicle. It is to be understood that the Figures are highly schematic and the invention may be arranged in a manner other than shown. As shown, the first lateral side 12 is a left side of the vehicle and will be described herein below in terms of the left side. However, the first lateral side 12 may also be a right side of the vehicle without varying the scope of the subject invention.

The drive assembly 10 includes a first wheel set 14 positioned at the first lateral, or left, side 12 of the vehicle. Specifically, the first wheel set 14 includes a first inner wheel 16 and a first outer wheel 18. Tires 20 are associated with the first inner and outer wheels 16, 18. The drive assembly 10 also includes a first drive mechanism 22 for rotatably driving the first inner and outer wheels 16, 18. As shown in FIG. 1, the first drive mechanism 22 is disposed between the first inner and outer wheels 16, 18. However, it is understood that the first drive mechanism 22 may also be located adjacent to only one of the wheels 16, 18. That is, the location of the first drive mechanism 22 is not important to the operation of the present invention.

In the preferred embodiment of the subject invention, the first drive mechanism 22 is a first electric motor 24 having a first output shaft 26. The first electric motor 24 includes a stator and a rotor as is known in the art. The first output shaft 26 of the first electric motor 24 is engaged with the rotor for rotating upon application of direct current to the stator. As appreciated, the direct current can be generated and applied to the stator of the first electric motor 24 by a separate battery, an internal combustion engine associated with the vehicle, or any other motor, such as a hydraulic motor.

The drive assembly 10 further includes a first differential 34 driven by the first drive mechanism 22. The first differential 34 is disposed between the first inner and outer wheels 16, 18 to permit the first inner and outer wheels 16, 18 to rotate relative to one another. The first differential 34 includes an input 28 driven by the first output shaft 26 of the first electric motor 24. The first differential 34 further includes a first output axle 36 engaged to the first inner wheel 16 and a second output axle 38 engaged to the first outer wheel 18. The first output shaft 26 drives the input 28 of the first differential 34 to permit one of the first inner and outer wheels 16, 18 to rotate independent of the other of the first inner and outer wheels 16, 18 thereby effecting different rotational speeds to the first inner and outer wheels 16, 18. In other words, the first differential 34 permits the first inner and outer wheels 16, 18 to rotate at different speeds, and the scrubbing of the tires 20 is reduced.

Figure 2:
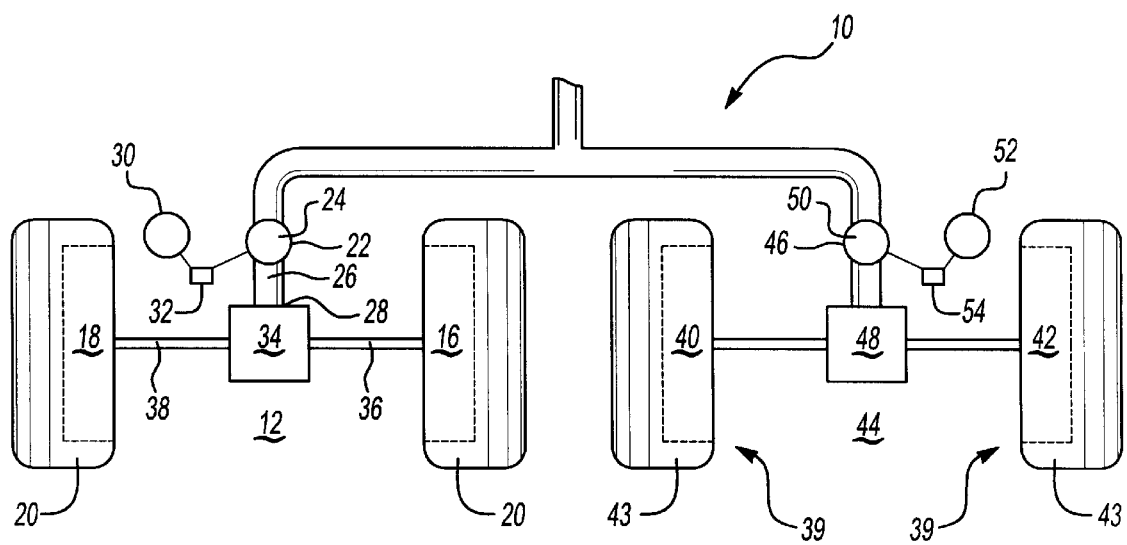
FIG. 2 is a schematic front view of the drive assembly for the vehicle illustrating the first wheel set positioned at the first lateral side of the vehicle and a second wheel set, second drive mechanism, and second differential positioned at a second lateral side of the vehicle.

Referring now to FIG. 2, the subject invention also improves upon the prior art by increasing the maneuverability of the vehicle. To accomplish this, the subject invention incorporates a second wheel set 39, a second drive mechanism 46, and a second differential 48 at a second lateral side 44 of the vehicle. As shown in FIG. 2, the second lateral side 44 of the vehicle is a right side of the vehicle. The second lateral, or right, side 44 of the vehicle is disposed opposite from the first lateral, or left, side 12 of the vehicle.

The second wheel set 39 includes a second inner wheel 40 and a second outer wheel 42, and tires 43 are associated with the first inner and outer wheels 40, 42. The second drive mechanism 46 rotatably drives the second inner and outer wheels 40, 42. In the preferred embodiment disclosed in FIG. 2, as with the first drive mechanism 22, the second drive mechanism 46 is an electric motor 50.

The second differential 48 is disposed between the second inner and outer wheels 40, 42 and is driven by the second drive mechanism 46. The second drive mechanism 46 drives the second differential 48 to permit one of the second inner and outer wheels 40, 42 to rotate independent of the other of the second inner and outer wheels 40, 42 thereby effecting different rotational speeds to the second inner and outer wheels 40, 42. Similar to the first differential 34, the second differential 48 reduces scrubbing of the tires 43 by permitting the second inner and outer wheels 40, 42 to rotate at different speeds.

By incorporating individual drive mechanisms 22, 46 for each wheel set 14, 39, maneuverability of the vehicle is increased. More specifically, a steering device of the vehicle steers the vehicle when an operator of the vehicle turns the steering device. The steering device may be a conventional steering wheel or any other device suitable for steering the vehicle without varying the scope of the subject invention. In the preferred embodiment of the subject invention, a turning radius of the vehicle is detected at the steering device. Alternatively, the turning radius of the vehicle may be detected at the wheel sets 14, 39 of the vehicle, or at any other suitable location.

A steering input signal, representative of the turning radius of the vehicle, is sent to a first controller 32 associated with the first wheel set 14. Similarly, a steering input signal is sent to a second controller 54 associated with the second wheel set 39. The first and second controllers 32, 54 send control signals to each of the drive mechanisms 22, 46 to drive the wheel sets 14, 39 at different speeds. That is, upon receipt of the steering input signal, the first controller 32 communicates a control signal to the first drive mechanism 22 to rotatably drive the first inner and outer wheels 16, 18 at a first speed, and the second controller 54 communicates a control signal to the second drive mechanism 46 to rotatably drive the second inner and outer wheels 40, 42 at a second speed. The second speed is either the same, slower, or faster than the first speed depending on whether the vehicle is driving straight or is turning in one direction or another.

For example, if the vehicle is at a stop and an operator desires to make a left turn, then the operator manually turns the steering device. Upon turning the steering device, the second drive mechanism 46 drives the second wheel set 39, which is on the outside of the turn, at the second speed and the first drive mechanism 22 drives the first wheel set 14 at the first speed. As a result, the vehicle turns left. The first speed of the first wheel set 14 may by zero such that the first wheel set 14 is stationary and the second wheel set 39 causes the vehicle to pivot about the first wheel set 14. Alternatively, if the operator desires to make a left turn and the first speed of the first wheel set 14 is not zero, then the second speed of the second wheel set 39 must be greater than the first speed of the first wheel set 14 in order to turn the vehicle left.

As shown in FIG. 2, control signals are sent to each of the drive mechanisms 22, 46 by the first and second controllers 32, 54, respectively. Alternatively, a common controller, not shown in the Figures, can be incorporated to send the control signals to each of the drive mechanisms 22, 46. In this alternative embodiment, the common controller communicates the control signals to rotatably drive both the first and second inner and outer wheels 16, 18, 40, 42. Additionally, sensors 30, 52 may be incorporated into the subject invention to sense the actual turning radius of the wheel sets 14, 39 and communicate information of the actual turning radius to the controllers 32, 54 for comparison with the desired turning radius from the steering device. With information of the actual turning radius, the controllers 32, 54 can modify the control signals sent to the first and second drive mechanisms 22, 46 as needed.

In addition to receiving and responding to information of the turning radius, the first and second controllers 32, 54 may also receive and respond to information of the load, or speed of the vehicle which may also affect the speeds at which the wheel sets 14, 39 are driven. The first and second drive mechanisms 22, 46 may also receive information from other inputs of the vehicle, such as an acceleration pedal, to also rotatably drive the first and second inner and outer wheels 16, 18, 40, 42.

In operation, the first and second inner and outer wheels 16, 18, 40, 42 of the vehicle and the vehicle itself may be propelled simply by turning the steering device of the vehicle. Alternatively, if the vehicle is already being propelled by the first or second drive mechanisms 22, 46 due to an input from the acceleration pedal of the vehicle, then the control signal from the first controller 32 to the first drive mechanism 22 and the control signal from the second controller 54 to the second drive mechanism 46 are not required. Instead, a control system associated with the acceleration pedal of the vehicle forwards an input signal to the first and second drive mechanisms 22, 46 to drive the first and second drive mechanisms 22, 46.

With the first and second drive mechanisms 22, 46 associated with each of the first 14 and second 39 wheel sets, respectively, the handling deficiencies identified in the prior art are also resolved. For example, if the operator of the vehicle turns the steering device, And only the first drive mechanism 22 is activated, the first wheel set 14 will rotate to cause the vehicle to pivot about the second wheel set 39 which remains stationary. Also, in the same example, as the first inner and outer wheels 16, 18 rotate, the first differential 34 operates to permit one of the first inner and outer wheels 16, 18 to rotate independently thereby reducing scrubbing of the tires 20 associated with the first wheel set 14 as the vehicle pivots about the second wheel set 39.

As a result of the first and second drive mechanisms 22, 46 driving the first and second wheel sets 14, 39, the maneuverability of the vehicle is increased. Additionally, the first and second differentials 34, 48 disposed between the wheels 16, 18, 40, 42 of the wheel sets 14, 39 reduce scrubbing of the tires 20, 43 throughout the turn of the vehicle.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A drive assembly for independently driving wheels of a vehicle, said assembly comprising:

a first wheel set positioned at a first lateral side of the vehicle, said first wheel set including a first inner wheel and a first outer wheel;

a first drive mechanism for rotatably driving said first inner and outer wheels;

a first differential disposed between said first inner and outer wheels and driven by said first drive mechanism to permit one of said first inner and outer wheels to rotate independent of the other of said first inner and outer wheels thereby effecting different rotational speeds to said first inner and outer wheels; and a first controller for communicating a control signal to said first drive mechanism to rotatably drive said first inner and outer wheels.

2. An assembly as set forth in claim 1 wherein said first drive mechanism is a first electric motor having a first output shaft.

3. An assembly as set forth in claim 2 wherein said first differential includes an input driven by said first output shaft of said first electric motor to permit one of said first inner and outer wheels to rotate independent of the other of said first inner and outer wheels.

4. An assembly as set forth in claim 3 wherein said first differential further includes a first output axle engaged to said first inner wheel and a second output axle engaged to said first outer wheel.

5. An assembly as set forth in claim 1 further including a first sensor for sensing an actual turning radius of said first wheel set of the vehicle.

6. An assembly as set forth in claim 1 further including a second wheel set positioned at a second lateral side of the vehicle, said second wheel set including a second inner wheel and a second outer wheel.

7. An assembly as set forth in claim 6 further including a second drive mechanism for rotatably driving said second inner and outer wheels, and a second differential disposed between said second inner and outer wheels and driven by said second drive mechanism to permit one of said second inner and outer wheels to rotate independent of the other of said second inner and outer wheels thereby effecting different rotational speeds to said second inner and outer wheels.

8. An assembly as set forth in claim 7 wherein said second drive mechanism is a second electric motor.

9. An assembly as set forth in claim 8 further including a second controller for communicating a control signal to said second drive mechanism to rotatably drive said second inner and outer wheels.

10. An assembly as set forth in claim 9 further including a second sensor for sensing an actual turning radius of said second wheel set of the vehicle.

11. A wheel set assembly for independently driving wheels of a vehicle, said assembly comprising:

a first wheel set having an inner and an outer wheel;

a second wheel set having and inner and an outer wheel;

a first electric motor having a first output shaft for rotatably driving said first wheel set;

a first differential disposed between said inner and outer wheels of said first wheel set and driven by said first output shaft of said first electric motor to permit one of said inner and outer wheels to rotate independent of the other of said inner and outer wheels thereby effecting different rotational speeds to said inner and outer wheels;

a first sensor for sensing an actual turning radius of said first wheel set of the vehicle and generating a first steering signal;

a second electric motor having a second output shaft for rotatably driving said second wheel set;

a second differential disposed between said inner and outer wheels of said second wheel set and driven by said second output shaft of said second electric motor to permit one of said inner and outer wheels to rotate independent of the other of said inner and outer wheels thereby effecting different rotational speeds to said inner and outer wheels; and a second sensor for sensing an actual turning radius of said second wheel set of the vehicle and generating a second steering signal wherein said first and second steering signals are compared to a desired turning radius to adjust control of said first and second electric motors.

12. An assembly as set forth in claim 11 including a first controller for communicating a first control signal to said first electric motor to rotatably drive said first wheel set.

13. An assembly as set forth in claim 12 including a second controller for communicating a second control signal to said second electric motor to rotatably drive said second wheel set.

14. An assembly as set forth in claim 13 wherein said first and second control signals are adjusted based on information supplied by said first and second steering signals.

* * * * *